(12) United States Patent
Smith

(10) Patent No.: US 12,003,851 B2
(45) Date of Patent: Jun. 4, 2024

(54) DIGITAL MIRROR ASSEMBLY

(71) Applicant: Delvin Smith, Cerritos, CA (US)

(72) Inventor: Delvin Smith, Cerritos, CA (US)

( * ) Notice: Subject to any disclaimer, the term of this patent is extended or adjusted under 35 U.S.C. 154(b) by 197 days.

(21) Appl. No.: 17/700,603

(22) Filed: Mar. 22, 2022

(65) Prior Publication Data
US 2023/0308749 A1   Sep. 28, 2023

(51) Int. Cl.
| | | |
|---|---|---|
| *H04N 23/661* | (2023.01) | |
| *G06F 3/041* | (2006.01) | |
| *H04N 23/55* | (2023.01) | |
| *H04N 23/56* | (2023.01) | |
| *H04N 23/90* | (2023.01) | |
| *H04R 1/02* | (2006.01) | |
| *H04R 1/08* | (2006.01) | |
| *H04R 1/40* | (2006.01) | |
| *H04R 3/12* | (2006.01) | |

(52) U.S. Cl.
CPC .......... *H04N 23/661* (2023.01); *G06F 3/041* (2013.01); *H04N 23/55* (2023.01); *H04N 23/56* (2023.01); *H04N 23/90* (2023.01); *H04R 1/028* (2013.01); *H04R 1/08* (2013.01); *H04R 1/403* (2013.01); *H04R 3/12* (2013.01)

(58) Field of Classification Search
None
See application file for complete search history.

(56) References Cited

U.S. PATENT DOCUMENTS

| | | | |
|---|---|---|---|
| 10,142,592 B1 | 11/2018 | Van Ness | |
| 10,554,878 B2 | 2/2020 | Lyle | |
| D877,104 S | 3/2020 | Khan | |
| 10,602,861 B2 | 3/2020 | Meyers | |
| 2013/0225922 A1* | 8/2013 | Schentag | A61B 1/0684 |
| | | | 600/109 |
| 2014/0023357 A1* | 1/2014 | Wong | H04N 23/51 |
| | | | 396/419 |
| 2018/0359376 A1 | 12/2018 | Krause | |
| 2020/0009444 A1 | 1/2020 | Putnam | |
| 2020/0079412 A1* | 3/2020 | Ramanathan | G06Q 20/322 |
| 2020/0225562 A1* | 7/2020 | Zheng | G08G 1/0116 |
| 2022/0011928 A1* | 1/2022 | Rowles | H04N 23/74 |
| 2022/0351608 A1* | 11/2022 | Macey | H04W 4/80 |

FOREIGN PATENT DOCUMENTS

WO    WO2008108558    9/2008

* cited by examiner

*Primary Examiner* — Eileen M Adams

(57) ABSTRACT

A digital mirror assembly for capturing photos using a plurality of cameras includes a base. The base has a front surface and a back surface. A plurality of cameras is positioned on the front surface. Furthermore, a plurality of lights is positioned on the front surface. A microprocessor is positioned in an interior of the base. The microprocessor is in electric communication with a battery, a receiver, the plurality of lights, the plurality of cameras, and a screen. The screen is positioned on the front surface of the base. The screen can either be a reflective surface or a computerized interface. The computerized interface resembles they layout of a smart phone device. The user can connect to the internet using the receiver. A flash positioned on the front surface goes off when the each of the cameras captures a photo. An actuator turns the digital mirror assembly on and off.

18 Claims, 5 Drawing Sheets

DIGITAL MIRROR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to computerized mirror apparatuses and more particularly pertains to a new computerized mirror apparatus for capturing photos using a plurality of cameras.

(2) Description of Related Art Including Information Disclosed Under 37 CFR 1.97 and 1.98

The prior art relates to computerized mirror apparatuses. Known prior art includes a variety of computerized mirror apparatuses comprising a camera and a screen having touch screen capabilities. Known prior art lacks a computerized mirror apparatus having a plurality of cameras and a plurality of lights configured for providing a flash.

BRIEF SUMMARY OF THE INVENTION

An embodiment of the disclosure meets the needs presented above by generally comprising a base. The base has a front surface and a back surface. The base has an interior. The interior of the base defines a space for a variety of elements to be positioned within. A plurality of cameras is configured for recording videos and capture photographs. Each light of a plurality of lights is a light emitting diode. A screen has touch screen capabilities and is configured for being positioned facing a user. The screen is configured for displaying either a reflective surface or a computerized interface. A microprocessor is in electric communication with the plurality of cameras. Furthermore, the microprocessor is in electric communication with both the plurality of lights and with the screen. The microprocessor is configured for processing the commands from the user to operate a variety of elements. A battery is in electric communication with the microprocessor. The battery is configured for providing electric power to the digital mirror assembly. A receiver is configured for being in communication with both a Wi-Fi router and with a Bluetooth transmitter. The microprocessor is in electric communication with the microprocessor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
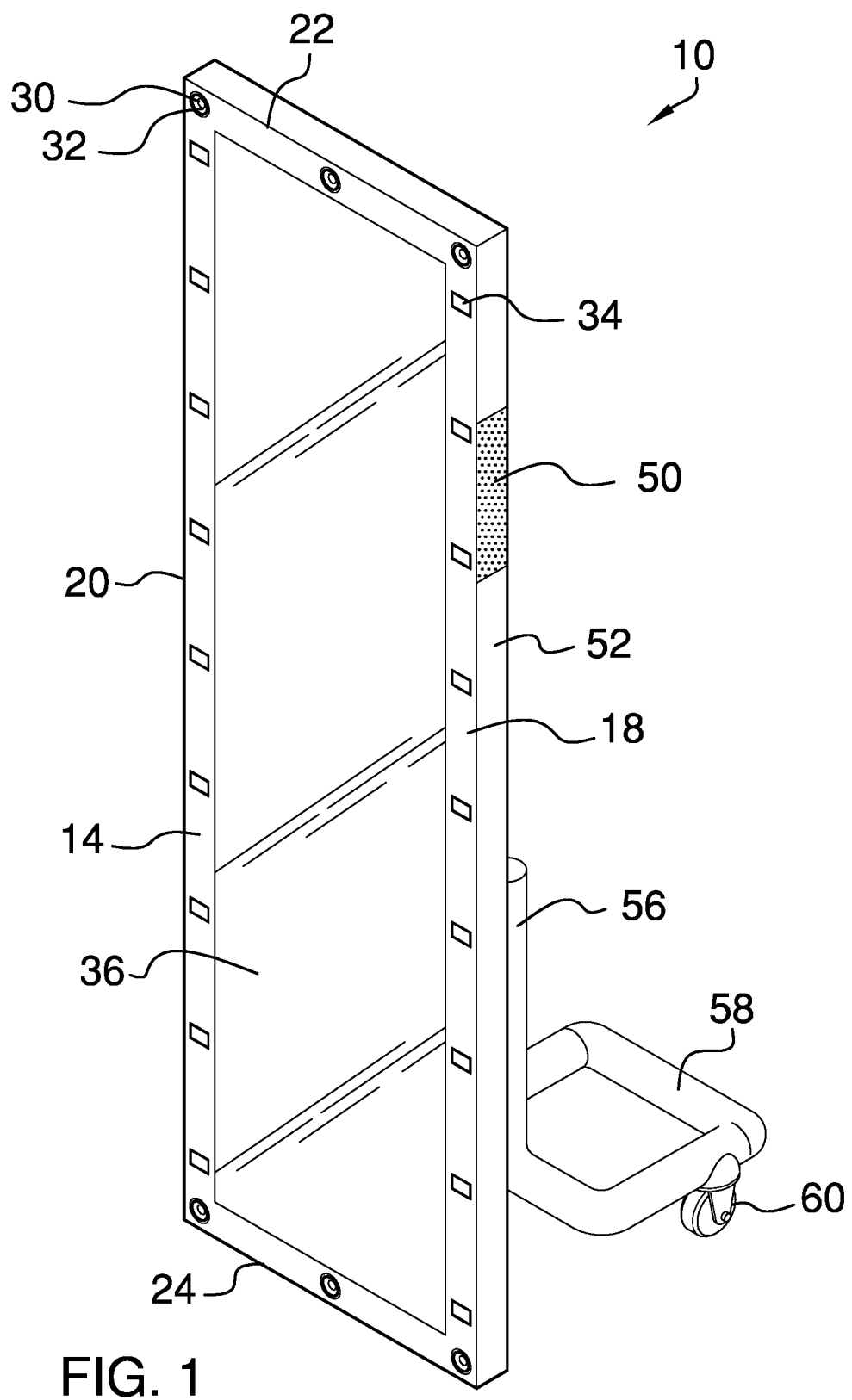
FIG. 1 is an isometric view of a digital mirror assembly according to an embodiment of the disclosure.
Figure 2:
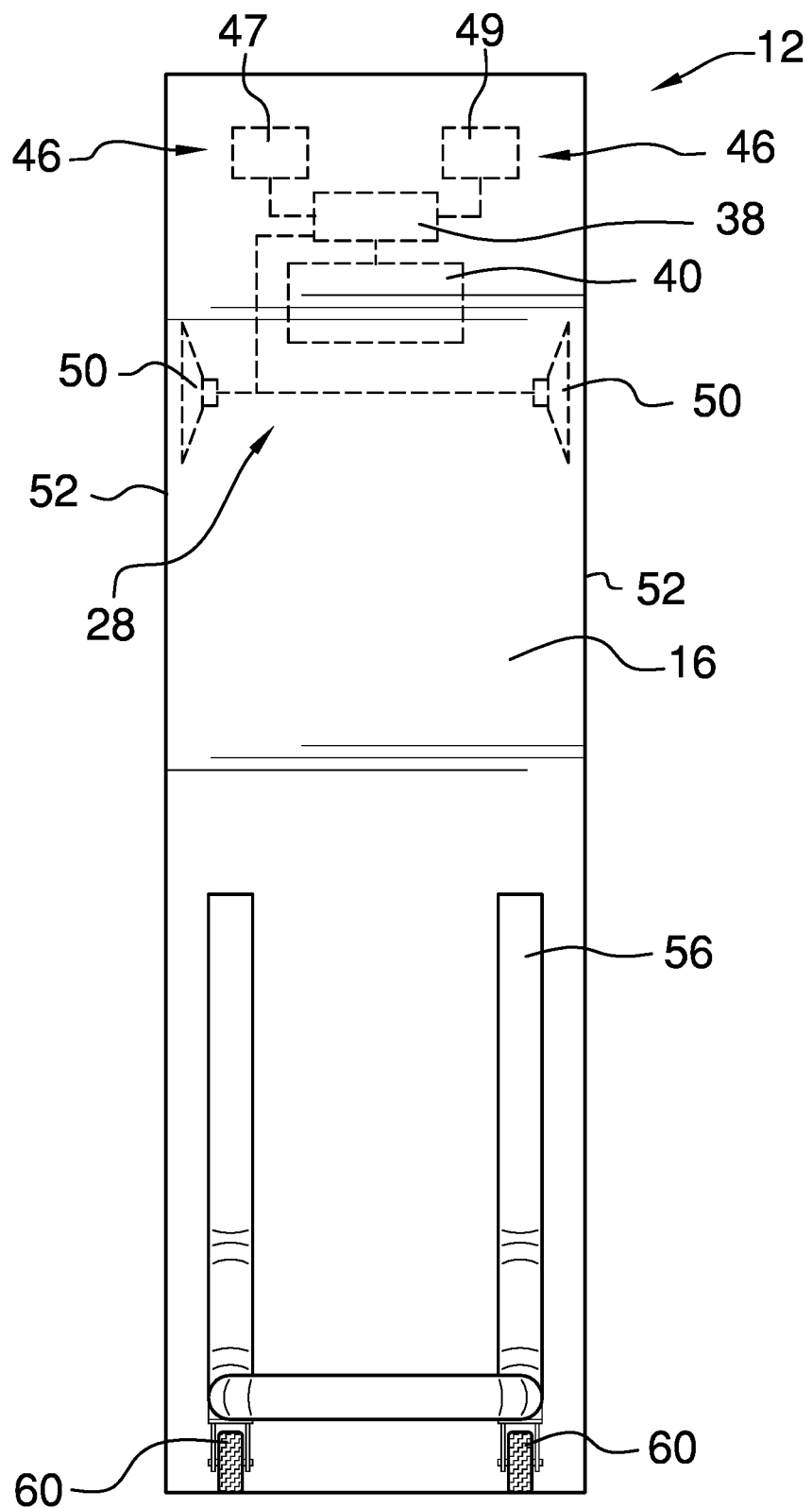
FIG. 2 is a back view of an embodiment of the disclosure.
Figure 3:
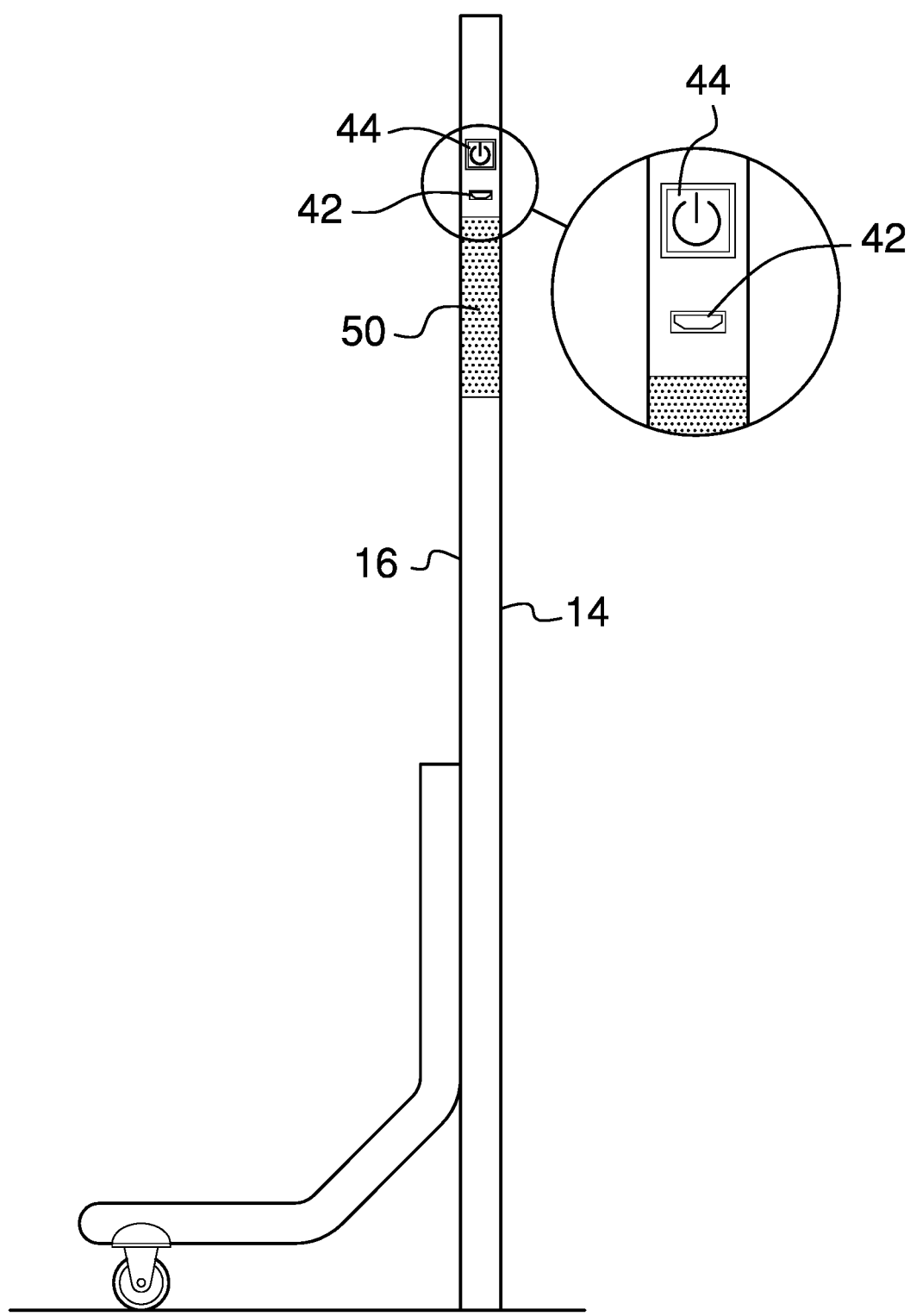
FIG. 3 is a side view of an embodiment of the disclosure.
Figure 4:
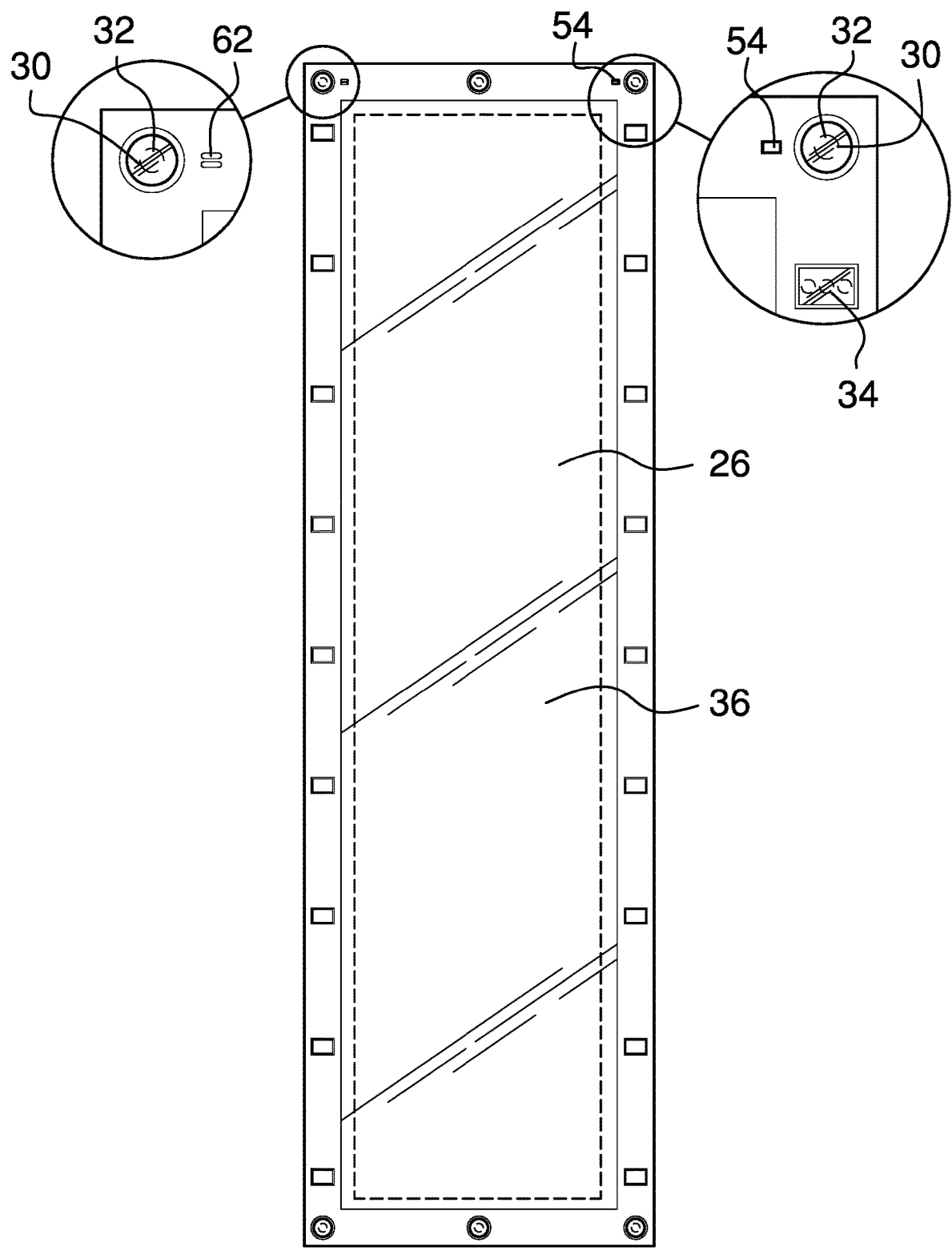
FIG. 4 is a front view of an embodiment of the disclosure.
Figure 5:
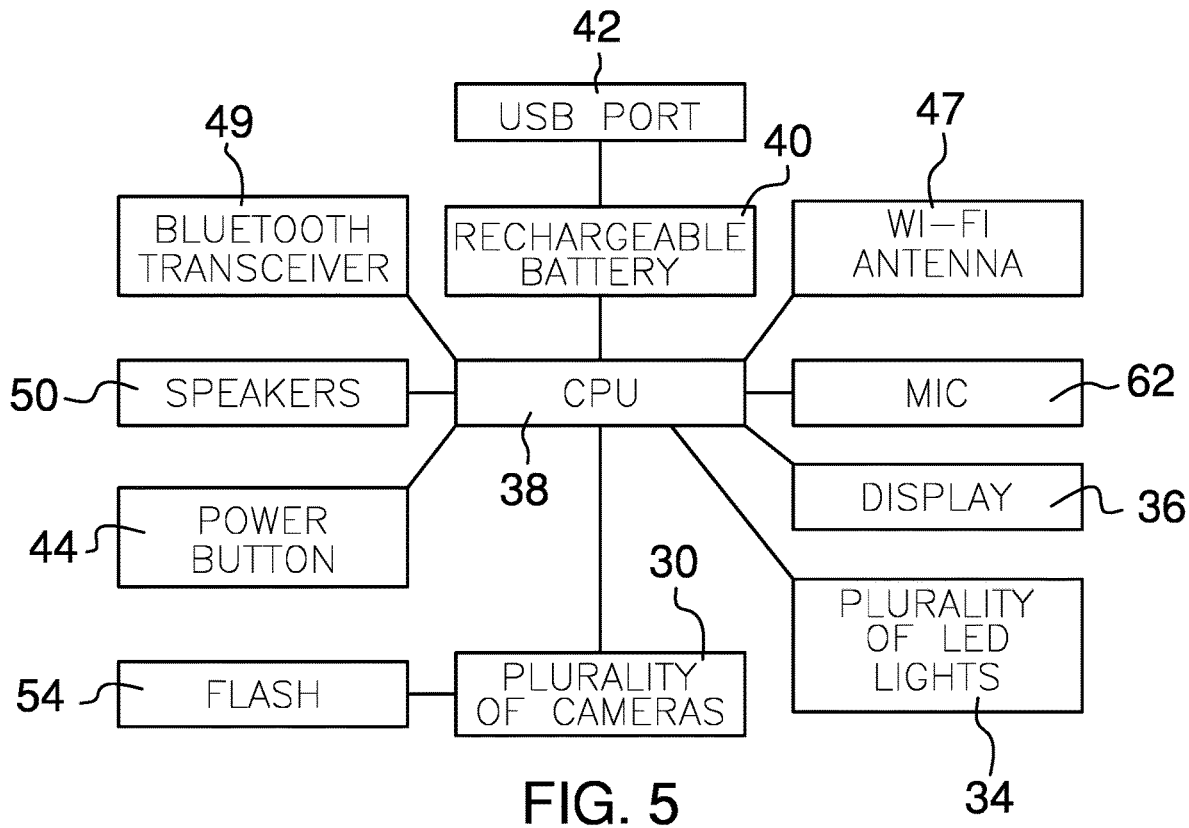
FIG. 5 is a block diagram view of an embodiment of the disclosure.
Figure 6:
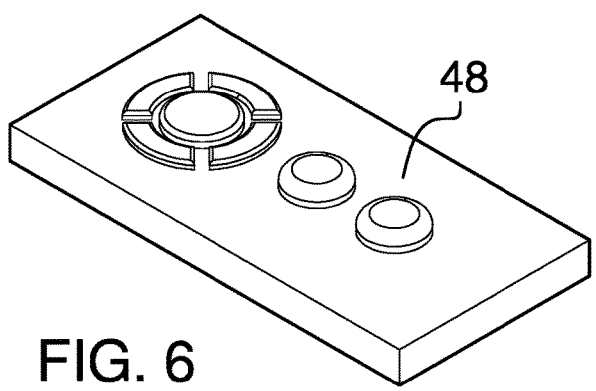
FIG. 6 is a isometric view of an embodiment of the disclosure of a remote element.

With reference now to the drawings, and in particular to FIGS. 1 through 6 thereof, a new computerized mirror apparatus embodying the principles and concepts of an embodiment of the disclosure and generally designated by the reference numeral 10 will be described.

As best illustrated in FIGS. 1 through 6, the digital mirror assembly 10 generally comprises a base 12. The base 12 is a rectangular prism shape. The base 12 has a front surface 14 and a back surface 16. The front surface 14 has a right edge 18 and a left edge 20. Furthermore, the front surface 14 has a top edge 22 and a bottom edge 24. The right edge 18 and the left edge 20 are positioned parallel relative to each other. The top edge 22 and the bottom edge 24 are positioned parallel relative to each other. The right edge 18 and the left edge 20 are positioned perpendicular relative to the top edge 22 and the bottom edge 24. The front surface 14 has a center 26. The base 12 has an interior 28 that defines a space for a variety of elements to be positioned within.

Each camera 30 of a plurality of cameras 30 is configured for recording videos and capturing photographs. The plurality of cameras 30 is configured for interchanging between each of the cameras 30, thus each camera 30 of the plurality of cameras 30 is in use while the rest are off. A lens 32 of each of the cameras 30 is positioned on the front surface 14 of the base 12. The plurality of cameras 30 is positioned proximate to both the top edge 22 of the front surface 14 and the bottom edge 24 of the front surface 14. The plurality of cameras 30 is configured for three cameras being positioned along the top edge 22, and three cameras being positioned along the bottom edge 24. Each of the cameras 30 is positioned to capture a different angle of the user when the user is standing in front of the front surface 14.

A plurality of lights 34 is positioned on the front surface 14 of the base 12. Each of the lights 34 is a light emitting diode. The plurality of lights 34 is positioned proximate to both the right edge 18 and the left edge 20 of the front surface 14. The plurality of lights 34 provides enhanced lighting to the user. A screen 36 is positioned in the center 26 of the front surface 14. The screen 36 is rectangular shaped and has touch screen capabilities. The screen 36 is configured to face the user and for displaying either a reflective surface or a computerized interface. The computerized interface would allow the user to interact with digital mirror assembly 10 with the use of the touch screen capabilities.

A microprocessor 38 is positioned in the interior 28 of the base 12. The microprocessor 38 is a central processing unit. The microprocessor 38 is in electric communication with both the plurality of lights 34 and with the plurality of cameras 30. Additionally, the microprocessor 38 is in electric communication with the screen 36 thus the microprocessor 38 is configured for processing the commands from the user to operate a variety of elements when using the screen 36. A battery 40 is positioned within the interior 28 of the base 12. The battery 40 is in electric communication with the microprocessor 38. Moreover, the battery 40 is in electric communication with a charging port 42. The charging port 42 is a universal serial bus port. The charging port 42 is positioned on a side of the base 12 and is configured for providing electric current to the battery 40. The battery 40 is configured for providing electric power to the digital mirror assembly 10.

An actuator 44 is positioned proximate to the charging port 42. The actuator 44 is a button switch and is configured for opening or closing a flow of electric power from the battery 40 to the microprocessor 38. When the flow of electric power is closed, the digital mirror assembly 10 is off; but when the flow of electric power is open, the digital mirror assembly 10 is on.

A receiver 46 is positioned in the interior 28 of the base 12. The receiver 46 has a Wi-Fi antenna 47 and a Bluetooth transceiver 49. The receiver 46 is configured for being in communication with both a Wi-Fi router and with a Bluetooth transmitter. Additionally, the receiver 46 is in communication with a remote 48. The remote 48 is configured for interacting with each of the cameras 30. The receiver 46 is in electric communication with the microprocessor 38. The receiver 46 sends the data it obtains to the microprocessor 38.

Each speaker 50 of a pair of speakers 50 is coupled to a respective one of each side 52 of a pair of sides 52 of the base 12. Each of the speakers 50 is configured for playing an audio obtained from the receiver 46. Each of the speakers 50 is in electric communication with the microprocessor 38. A flash 54 is in electric communication with the microprocessor 38 and with each of the cameras 30. The flash 54 is a high powered light that is configured for turning on for a shortened moment of time when each of the cameras 30 in use. A microphone 62 positioned on the front surface 14 can record audio from the user. The microphone 62 is in electric communication with the microprocessor 38.

A support 56 is coupled to the back surface 16 of the base 12. The support 56 is a stand that is positioned perpendicular to the base 12. An end 58 of the support 56 has a pair of wheels 60. Each of the wheels 60 is a caster locking wheels. The pair of wheels 60 is configured for full circle rotation. The support 56 is configured for providing reinforcement to the base 12 whereby preventing the base 12 from falling over. The support 56 can also facilitate the mobility of the digital mirror assembly 10 by carting the base 12 with the pair of wheels 60.

In use, when off, the screen 36 is a reflective surface. The user presses the actuator 44 to start the digital mirror assembly 10. The screen 36 becomes a computerized interface to resemble a smart phone. The user can then take photos or videos using each of the cameras 30. The user can also interact with the Internet when the receiver 46 is in communication with a Wi-Fi router. The user can send music from a mobile device to the receiver 46 to be played by the pair of speakers 50. When complete, the user presses the actuator 44 again to turn off the digital mirror assembly 10, whereby turning the screen 36 into a reflective surface to mimic a mirror.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A digital minor assembly comprising:
   a base, said base having a front surface and a back surface, said base having an interior, said interior of said base defining a space for a variety of elements to be positioned within;
   a plurality of cameras, each of said cameras being configured for recording videos and capturing photographs;
   a plurality of lights, each of said lights being a light emitting diode;
   a screen, said screen having touch screen capabilities, said screen being configured for being positioned facing a user, said screen being configured for displaying either a reflective surface or a computerized interface;
   a microprocessor, said microprocessor being in electric communication with said plurality of cameras, said microprocessor being in electric communication with said plurality of lights, said microprocessor being in electric communication with said screen, said microprocessor being configured for processing the commands from the user to operate a variety of elements;
   a battery, said battery being in electric communication with said microprocessor, said battery being configured for providing electric power to said digital mirror assembly;

a receiver, said receiver being configured for being in communication with both a Wi-Fi router and with a Bluetooth transmitter, said receiver being in electric communication with said microprocessor; and a support, said support being coupled to said back surface of said base of the digital mirror assembly, said support being a stand, said support being positioned perpendicular to said base, said support having a pair of wheels, each of said wheels being a caster locking wheel.

2. The digital mirror assembly of claim 1, further comprising said base being a rectangular prism shape.

3. The digital mirror assembly of claim 1, further comprising said front surface having a right edge and a left edge, said front surface having a top edge and a bottom edge.

4. The digital mirror assembly of claim 3, further comprising said right edge and said left edge being parallel relative to each other, said top edge and said bottom edge being parallel to each other, said right edge and said left edge being perpendicular relative to said top edge and said bottom edge.

5. The digital mirror assembly of claim 3, further comprising said plurality of cameras being positioned proximate to said top edge of said front surface and to said bottom edge of said front surface.

6. The digital mirror assembly of claim 3, further comprising said plurality of lights being positioned proximate to said right edge of said front surface and said left edge of said front surface.

7. The digital mirror assembly of claim 1, further comprising said front surface having a center.

8. The digital mirror assembly of claim 7, further comprising said screen being positioned in said center of said front surface, said screen having a rectangular shape.

9. The digital mirror assembly of claim 1, further comprising each of said cameras having a lens, said lens of each of said cameras being positioned on said front surface of said base.

10. The digital mirror assembly of claim 1, further comprising said microprocessor being a central processing unit, said microprocessor being positioned within said interior of said base.

11. The digital mirror assembly of claim 1, further comprising said battery being positioned within said interior of said base.

12. The digital mirror assembly of claim 1, further comprising said battery being in electric communication with a charging port, said charging port being a universal serial bus port, said charging port being positioned on a side of said base, said battery being rechargeable, said charging port being configured for providing electric current to said battery.

13. The digital mirror assembly of claim 1, further comprising an actuator, said actuator being a button switch, said actuator being configured for opening or closing the flow of electric power from the battery to the microprocessor whereby turning the digital mirror assembly on or off.

14. The digital mirror assembly of claim 1, further comprising a receiver, said receiver being positioned in said interior of said base, said receiver having a Wi-Fi antenna and a Bluetooth transceiver, said receiver being in Bluetooth communication with a remote, said remote being configured for interacting with each of said cameras.

15. The digital mirror assembly of claim 1, further comprising a pair of speakers, each of said speakers being coupled to a respective one of each side of a pair of sides of said base, said pair of speakers being in electric communication with said microprocessor, said pair of speakers being configured for sounding an audio.

16. The digital mirror assembly of claim 1, further comprising a microphone, said microphone being positioned on said front surface of said base, said microphone being configured for recording audio from the user, said microphone being in electric communication with said microprocessor.

17. The digital mirror assembly of claim 1, further comprising a flash, said flash being a high powered light, said flash being in electric communication with both said plurality of cameras and with said microprocessor said flash being configured for turning on for a shortened moment of time when said each of said cameras being in use.

18. A digital mirror assembly comprising:

a base, said base being a rectangular prism shape, said base having a front surface and a back surface, said front surface having a right edge and a left edge, said front surface having a top edge and a bottom edge, said right edge and said left edge being parallel relative to each other, said top edge and said bottom edge being parallel to each other, said right edge and said left edge being perpendicular relative to said top edge and said bottom edge, said front surface having a center, said base having an interior, said interior of said base defining a space for a variety of elements to be positioned within;

a plurality of cameras, each of said cameras being configured for recording videos and capturing photographs, each of said cameras having a lens, said lens of each of said cameras being positioned on said front surface of said base, said plurality of cameras being positioned proximate to said top edge of said front surface and to said bottom edge of said front surface;

a plurality of lights, each of said lights being a light emitting diode, said plurality of lights being positioned proximate to said right edge of said front surface and said left edge of said front surface;

a screen, said screen being positioned in said center of said front surface, said screen having a rectangular shape, said screen having touch screen capabilities, said screen being configured for being positioned facing a user, said screen being configured for displaying either a reflective surface or a computerized interface;

a microprocessor, said microprocessor being a central processing unit, said microprocessor being positioned within said interior of said base, said microprocessor being in electric communication with said plurality of cameras, said microprocessor being in electric communication with said plurality of lights, said microprocessor being in electric communication with said screen, said microprocessor being configured for processing the commands from the user to operate a variety of elements;

a battery, said battery being positioned within said interior of said base, said battery being in electric communication with said microprocessor, said battery being in electric communication with a charging port, said charging port being a universal serial bus port, said charging port being positioned on a side of said base, said charging port being configured for providing electric current to said battery, said battery being rechargeable, said battery being configured for providing electric power to said digital mirror assembly;

an actuator, said actuator being a button switch, said actuator being configured for opening or closing the flow of electric power from the battery to the microprocessor whereby turning the digital mirror assembly on or off;

a receiver, said receiver being positioned in said interior of said base, said receiver having a Wi-Fi antenna and a Bluetooth transceiver, said receiver being configured for being in communication with both a Wi-Fi router and with a Bluetooth transmitter, said receiver being in Bluetooth communication with a remote, said remote being configured for interacting with each of said cameras, said receiver being in electric communication with said microprocessor;

a pair of speakers, each of said speakers being coupled to a respective one of each side of a pair of sides of said base, said pair of speakers being in electric communication with said microprocessor, said pair of speakers being configured for sounding an audio;

a microphone, said microphone being positioned on said front surface of said base, said microphone being configured for recording audio from the user, said microphone being in electric communication with said microprocessor;

a flash, said flash being a high powered light, said flash being in electric communication with both said plurality of cameras and with said microprocessor said flash being configured for turning on for a shortened moment of time when said each of said cameras being in use; and a support, said support being coupled to said back surface of said base, said support, being a stand, said support being positioned perpendicular to said base, said support having a pair of wheels, each of said wheels being a caster locking wheel.

\* \* \* \* \*